United States Patent
Ferrenq et al.

(10) Patent No.: US 8,370,334 B2
(45) Date of Patent: Feb. 5, 2013

(54) DYNAMIC UPDATING OF DISPLAY AND RANKING FOR SEARCH RESULTS

(75) Inventors: Isabelle Ferrenq, Saint Lattier (FR); Pierre-Yves Chevalier, Biviers (FR)

(73) Assignee: EMC Corporation, Hopkinton, MA (US)

( * ) Notice: Subject to any disclaimer, the term of this patent is extended or adjusted under 35 U.S.C. 154(b) by 668 days.

(21) Appl. No.: 11/522,498

(22) Filed: Sep. 15, 2006

(65) Prior Publication Data

US 2008/0071763 A1 Mar. 20, 2008

(51) Int. Cl.
*G06F 7/00* (2006.01)

(52) U.S. Cl. .......................................... 707/723

(58) Field of Classification Search ................ 707/1, 2, 707/3, 4, 5, 723
See application file for complete search history.

(56) References Cited

U.S. PATENT DOCUMENTS

| | | | |
|---|---|---|---|
| 6,012,053 A | 1/2000 | Pant et al. | |
| 6,212,634 B1 | 4/2001 | Geer et al. | |
| 6,269,361 B1 | 7/2001 | Davis et al. | |
| 6,275,820 B1 | 8/2001 | Navin-Chandra et al. | |
| 6,385,602 B1 | 5/2002 | Tso et al. | |
| 6,728,704 B2* | 4/2004 | Mao et al. | 707/3 |
| 6,738,764 B2 | 5/2004 | Mao et al. | |
| 7,024,405 B2* | 4/2006 | Salerno et al. | 707/3 |
| 2002/0023084 A1 | 2/2002 | Eyal et al. | |
| 2002/0052674 A1 | 5/2002 | Chang et al. | |
| 2003/0014399 A1 | 1/2003 | Hansen et al. | |
| 2004/0093321 A1 | 5/2004 | Roustant et al. | |
| 2005/0114324 A1* | 5/2005 | Mayer | 707/3 |
| 2005/0222981 A1* | 10/2005 | Lawrence et al. | 707/3 |
| 2006/0190308 A1* | 8/2006 | Janssens et al. | 705/5 |
| 2006/0230035 A1* | 10/2006 | Bailey et al. | 707/5 |
| 2006/0248059 A1* | 11/2006 | Chi et al. | 707/3 |
| 2006/0271883 A1 | 11/2006 | Bier et al. | |
| 2006/0282416 A1 | 12/2006 | Gross et al. | |
| 2007/0022296 A1 | 1/2007 | Caverly et al. | |
| 2007/0057951 A1 | 3/2007 | Anthony et al. | |
| 2007/0112761 A1* | 5/2007 | Xu et al. | 707/5 |
| 2007/0282797 A1* | 12/2007 | Wang et al. | 707/3 |
| 2008/0010269 A1* | 1/2008 | Parikh | 707/5 |

OTHER PUBLICATIONS

Richard Lee, "Former Executives from Travelocity, Orbitz, Expedia Developing Online Travel Site," The Stamford Advocate, Oct. 12, 2004, http://www.hotel-online.com/News/PR2004_4th/Oct04_Kayak.html.

* cited by examiner

*Primary Examiner* — Amy Ng

(74) *Attorney, Agent, or Firm* — Van Pelt, Yi & James LLP

(57) ABSTRACT

Presenting search results is disclosed. At least a portion of a first set of results is displayed in an order determined at least in part by a corresponding attribute of each respective result. An updated display of at least a portion of a combined set that includes at least a part of the first set of results and at least a part of the second set of results in an order determined at least in part by the corresponding attribute of each respective result in the combined set is displayed automatically.

27 Claims, 4 Drawing Sheets

DYNAMIC UPDATING OF DISPLAY AND RANKING FOR SEARCH RESULTS

BACKGROUND OF THE INVENTION

Search results from search engines return results relevant to the search requested and display the results to the requester. In some cases, a delay in being able to view a display of the results when results are returned in response to the search request and the results require some processing—for example, in order to determine relevance, to sort the returned results, to acquire the results from a number of sources, etc. In a typical search application that supports presenting an initial set of results and later integrating additional results, a user must manually indicate a desire to see additional results, such as by selecting an "update" control. It would be beneficial to be able to efficiently and correctly integrate additional search results in an existing display of search results without requiring user intervention or other input or delay.

BRIEF DESCRIPTION OF THE DRAWINGS

Various embodiments of the invention are disclosed in the following detailed description and the accompanying drawings.

DETAILED DESCRIPTION

Figure 1:
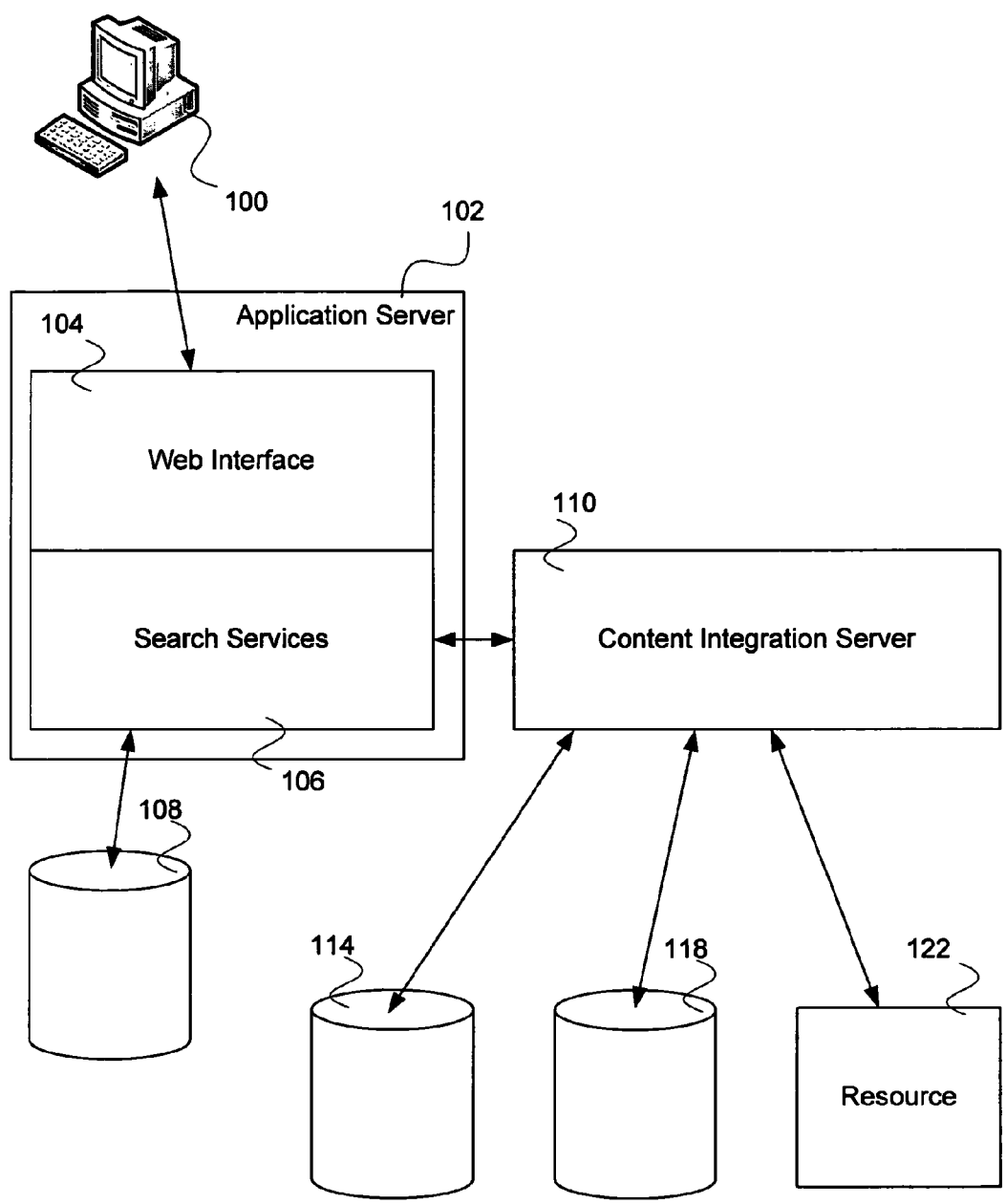
FIG. 1 is a block diagram illustrating an embodiment of a system for providing search results.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Presenting search results is disclosed. At least a portion of a first set of results is displayed in an ordered determined at least in part by a respective degree of relevance to a search of each of at least a subset of the results. An updated display is provided automatically of at least a portion of a combined set that includes at least a part of the first set of results and at least a part of the second set of results in an order determined at least in part by a degree of relevance to the search of each respective result in the combined set.

In some embodiments, a first set of results is received responsive to a search. In various embodiments, the first set of results is received from a first repository, a first source, a first processing batch, etc. At least a subset of the first set of results is displayed. A second set of results responsive to the search is received, e.g., from a second repository, a second source, a second processing batch, etc., and integrated dynamically into the results displayed.

In some embodiments, search results are dynamically displayed and ranked for relevance in an automatic fashion. The display is updated dynamically as one or more subsequent sets of results are received—for example, from a process that prepares results for integration into the display, e.g., by normalizing the results, receiving, determining, or interpreting a relevance score, or sorting by currency/freshness (date) or other measure, etc., or from one or more different repositories or sources, etc. Search result entries are displayed according to updated rankings and summary totals are also dynamically updated.

FIG. 1 is a block diagram illustrating an embodiment of a system for providing search results. In the example shown, one or more users connect to web-based application server 102 using a computer system, represented in FIG. 1 by computer 100. In the example shown, web-based application server 102 includes web interface 104. Web-based application server 102 in some embodiments provides to users search services that are metadata or type aware. An example of a search service that is metadata or type aware includes providing search results based at least in part on content item type, e.g., sorting relevance based on file type such as picture file, text file, database file, spreadsheet file, computer aided design file, page layout file, drawing file, word processor file, slide presentation file, etc. Web-based application server 102 also includes search services 106. In some embodiments, search services 106 are included in a content management framework comprising foundation classes and associated services configured to provide content management functionality. In some embodiments, the content management functionality includes the ability to perform a federated search of multiple repositories, potentially of dissimilar type. In some embodiments, if search results from two or more repositories at different times, e.g., due to differences in response time, processing required to normalize and/or integrate results, etc., results from a first repository may be presented and/or integrated into a display of results, e.g., in relevance rank order, before results from a second repository have been received and/or are ready to be integrated and/or displayed. When subsequently received and/or ready for integration and/or display, in some embodiments results from the second repository are integrated dynamically into the search results display, automatically and without requiring any refresh or other input from a user, e.g., by adding at least a subset of results from the second repository to previously received and processed results to create a combined set of results, sorting the combined set, for example by relevance to the search query, and updating the display to present at least a subset (e.g., the most relevant) of the results in the combined set.

In some embodiments, web-based application server 102 comprises a content management system, and a user submits a search query to the content management system. The content management application and/or a service associated therewith in some embodiments searches both one or more internal repositories associated with the application server and one or more external repositories and other attached resources. In some embodiments, the search query is received via a web interface such as interface 104, which invokes search services 106 to perform the search. Search services 106 performs a direct search of internal repository 108 and an indirect search of external repositories/resources via content integration server 110. Content integration server 110 targets the search request for a search of one or more external repositories, represented in FIG. 1 by 114 and 118, and/or other resources, represented in FIG. 1 by 122. In various embodiments, external repositories comprise content management systems, database systems, legacy content management systems not capable of the type of search desired, (e.g., Filenet™, LexisNexis™, Lotus NoteS™, etc.). In various embodiments, other resources include information sources or search services—for example, Google™, Yahoo™, MSN™, MySimon™, Pricewatch™, Ask™, etc. In some embodiments, the targeted search request is translated and adapted using a configuration adapter, not shown in FIG. 1. The configuration adapter also translates and adapts the responses to the search request and passes the responses to content integration server 110. In some embodiments, the configuration adapter includes associated information in the response to the search request. In some embodiments, the associated information is ultimately used as metadata information that enables the content management system to treat the search results as typed information for the results of the search.

Figure 2:
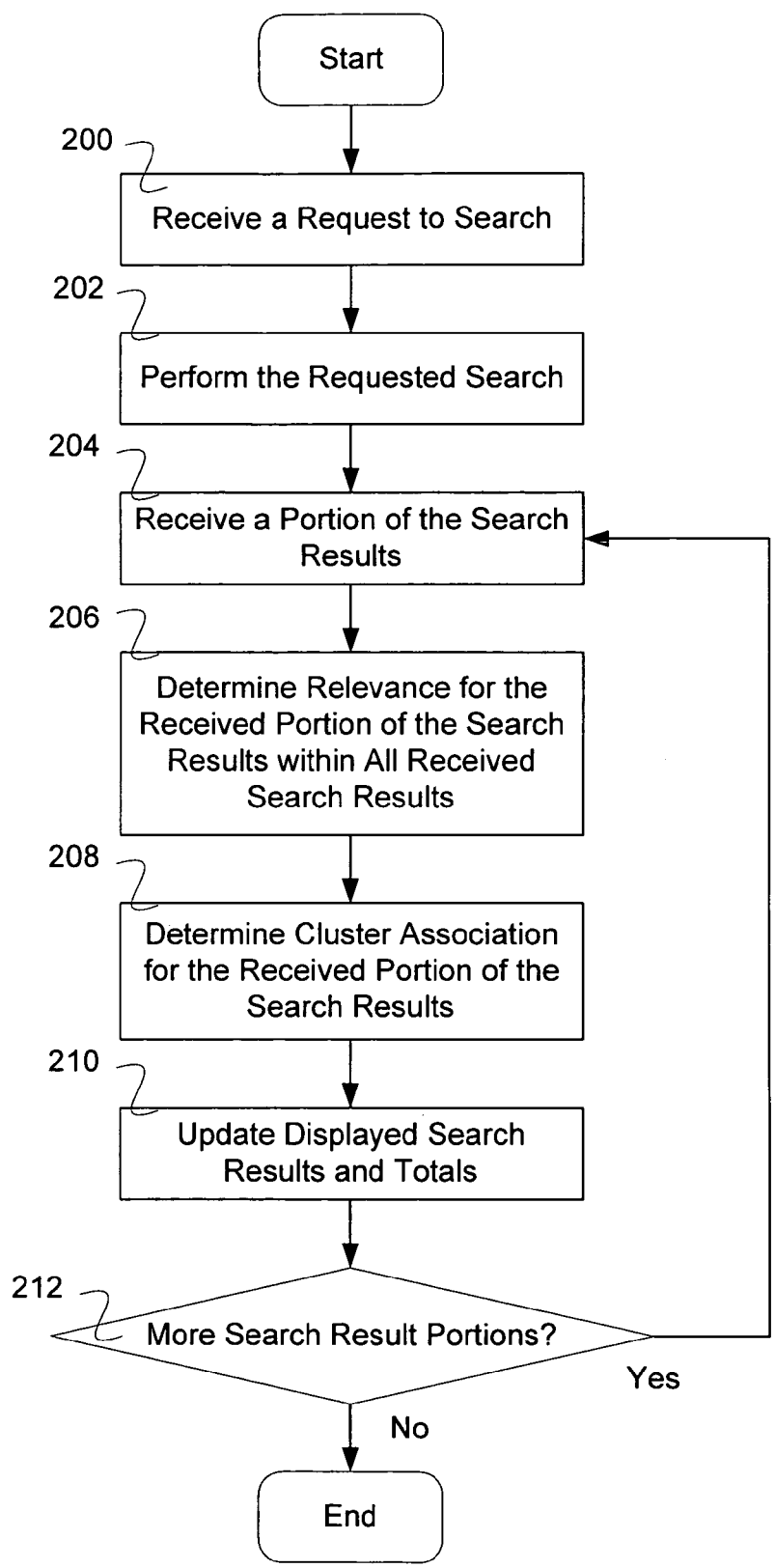
FIG. 2 is a flow diagram illustrating an embodiment of a process for presenting search results.

FIG. 2 is a flow diagram illustrating an embodiment of a process for presenting search results. In some embodiments, the process of FIG. 2 is executed on a web-based application server such as web-based application server 102 of FIG. 1. In the example shown, in 200 a search request is received. In 202, the search is performed. In 204, a portion of the results of the search are received. In 206, relevance is determined for the received portion of the search results. In some embodiments, if other results were received previously, 206 includes determining the relevance of the new results relative to all received search results, e.g., by receiving or determining a normalized or common measure of relevance (e.g., a score or other measure) and sorting the combined results by relevance. In various embodiments, relevance is calculated using web page ranking algorithms including hypertext induced topic selection (HITS) algorithm, PageRank™, TrustRank™, or any other appropriate algorithm. In some embodiments, relevance is calculated based at least in part on one or more of the following: file elements, title words, keywords, text topic areas, related term use, metadata, citation or reference links, document organization and hierarchy, headings, age of file, size of file, type of file, grammar use, spelling accuracy, stop word frequency, reading level, duplicate content, or any other appropriate relevance basis. In some embodiments, the relevance is determined by an entity other than a content management system configured to search multiple repositories, e.g., by the respective repositories themselves and/or an intermediary or other third party, and reported or otherwise provided to the content management system.

In 208, respective associated cluster(s) for the received portion of the search results is/are determined. In some embodiments, an associated cluster includes search results that are determined to be similar for a particular aspect of the search result (e.g., an aspect can be the subject, the file type, the time period, a keyword, the source, the company, the organization, etc.).

In 210, search results and totals are updated in the search results display. In some embodiments, a display of search results is updated such that the ordering of the displayed results is updated. In various embodiments, totals summarizing the search results are updated on the display including one or more of the following: total number of search results, total number of three star rated search results, total number of two star rated search results, total number of one star rated search results, total number of no star rated search results, total number of search results associated with a given cluster, or any other any other appropriate total of the search result display.

In 212, it is determined if there are more search result portions. If there are more search result portions, then control passes to 204. If there are not more search result portions, then the process ends.

Figure 3:
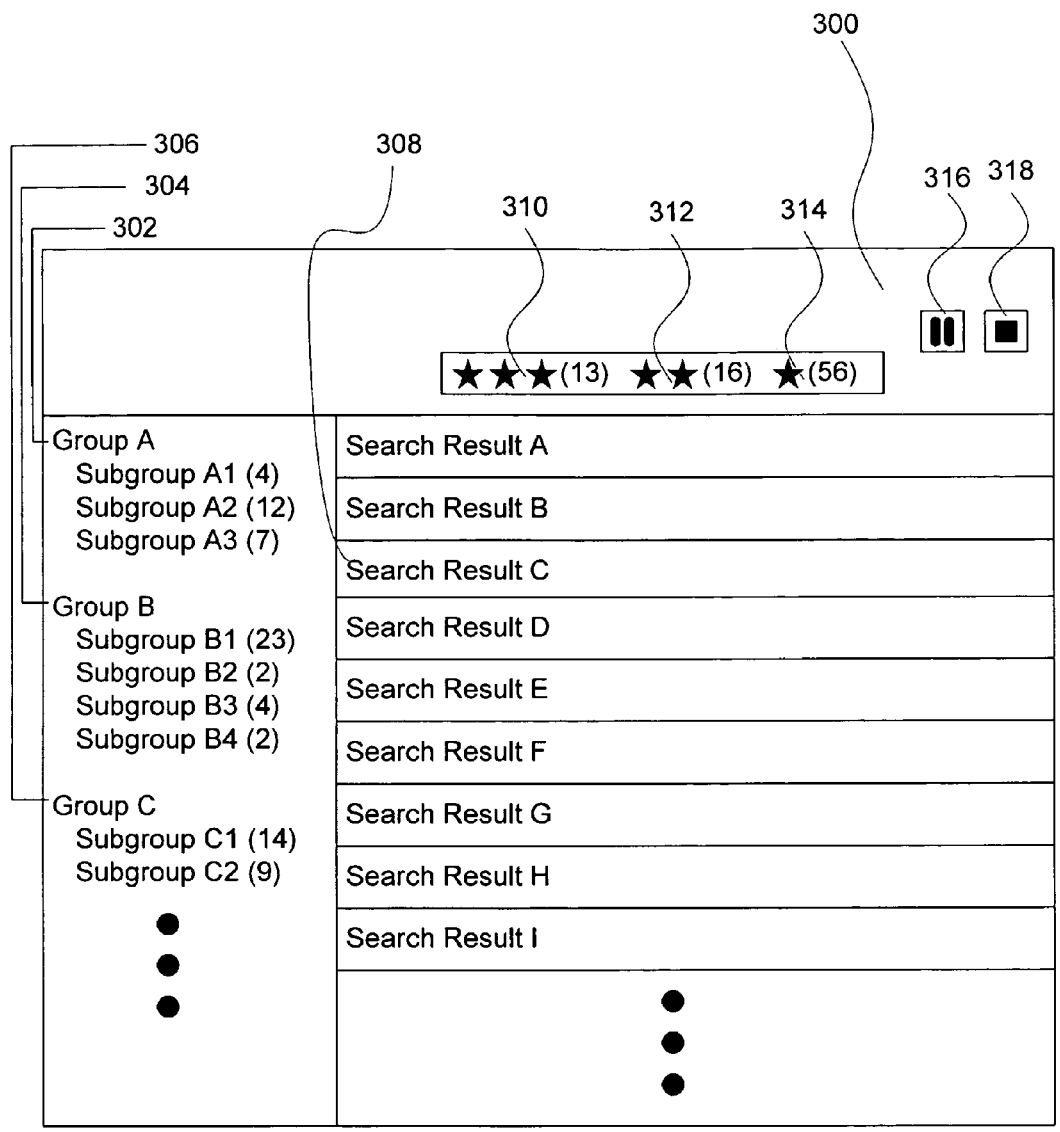
FIG. 3 is a block diagram illustrating a search results window in one embodiment.

FIG. 3 is a block diagram illustrating a search results window in one embodiment. In some embodiments, the results of the process of FIG. 2 are displayed using the window of FIG. 3. In the example shown, search results display window 300 includes cluster results, search results, ranking summary, and control buttons. Cluster results are displayed in a side bar area of the window. A plurality of clusters are displayed, represented in FIG. 3 by group A 302 with subgroups A1, A2, and A3 (with associated number of results 4, 12, and 7, respectively), group B 304 with subgroups B1, B2, B3, and B4 (with associated number of results 23, 2, 4, and 2, respectively), and group C 306 with subgroups C1 and C2 (with associated number of results 14 and 9, respectively). Examples of groups include by source (e.g., repository, organization, author, etc.), subject, keyword, geographic origin, associated geographic designator (e.g., city or other locale mentioned in or otherwise determined to be associated with result), title, etc. Examples of a subgroup include a specific repository, subject, keyword, etc.

Search results are displayed in a main area of the window. A plurality of search results are displayed, represented in the example shown in FIG. 3 by search results A-I, including search result C (308). The ranking summary is displayed in a top area of the window. The ranking summary includes the total number of search results with a given star ranking. In the example shown, 13 search results have a three star ranking 310, 16 results have a two star ranking 312, and 56 results have a one star ranking 314. In some embodiments, a no star ranking and no star associated search results are displayed (not shown in FIG. 3). In various embodiments, one or more of the following are shown in the search results display window (not shown in FIG. 3): a total number of search results, a total number of search results shown on the current window page, a total number of window page results, or any other appropriate statistics or totals relevant to the search results.

Control buttons are displayed in a top area of the window. Pause button 316 enables a user to indicate that a pause of the automatic updating of the display is desired without terminating an on-going search. Stop button 318 enables a user to indicate that a stop of the automatic updating of the display and a stop of the on-going search are desired. The stop can be useful in the event that the search is taking to long, sufficient results have been located, or the search is hanging waiting for initial or additional results.

Figure 4:
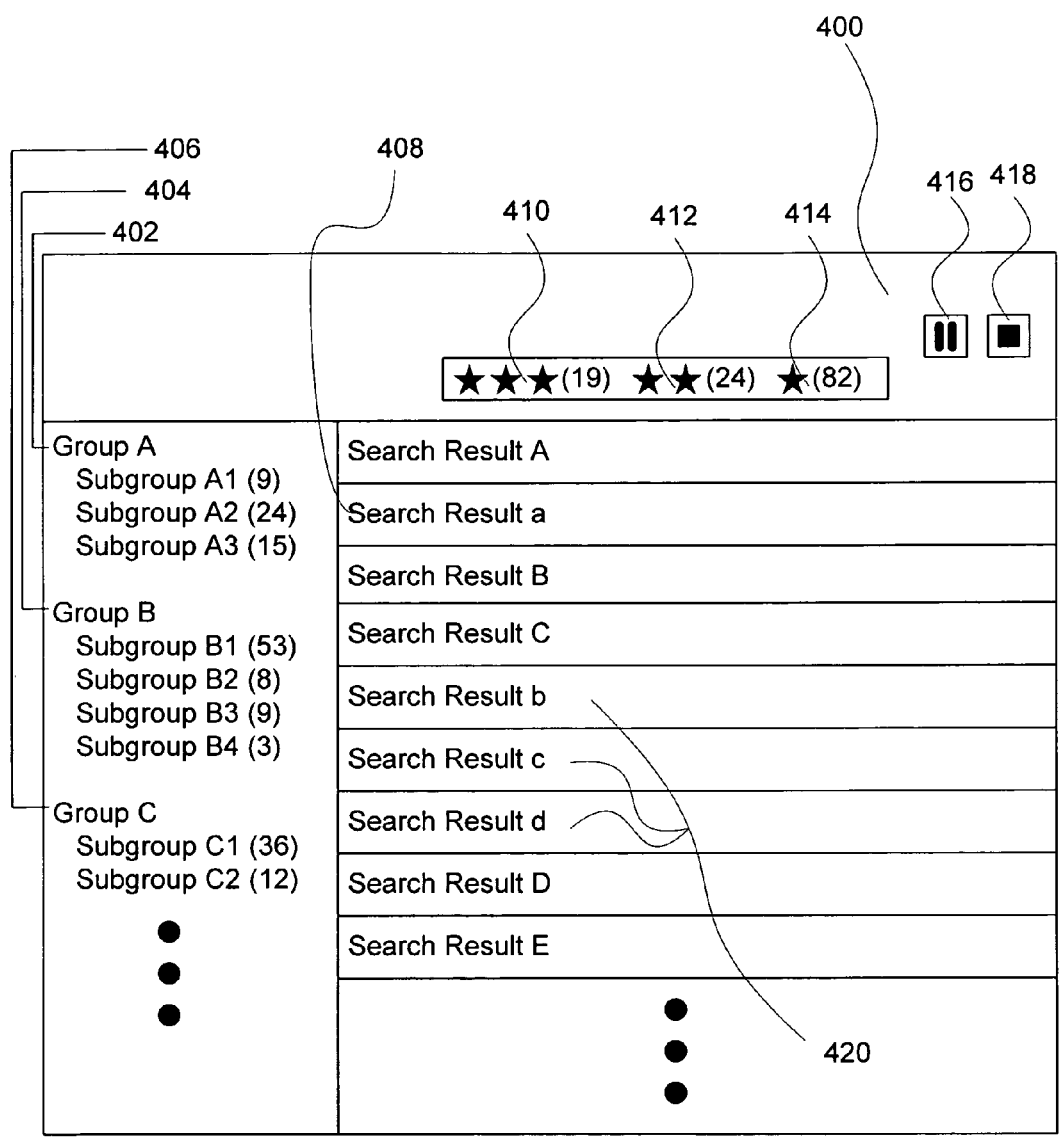
FIG. 4 is a block diagram illustrating an updated search results window in one embodiment.

FIG. 4 is a block diagram illustrating an updated search results window in one embodiment. In some embodiments, the updated results of the process of FIG. 2 are displayed using the window of FIG. 4. In the example shown, updated search results display window 400 includes updated cluster results, updated search results, an updated ranking summary, and control buttons. Updated cluster results are displayed in a side bar area of the window. A plurality of updated clusters are displayed, represented in FIG. 4 by group A 402 with subgroups A1, A2, and A3 (with updated associated number of results of 9, 24, and 15, respectively), group B 404 with subgroups B1, B2, B3, and B4 (with updated associated number of results of 53, 8, 9, and 3, respectively), and group C 406 with subgroups C1 and C2 (with updated associated number of results of 36 and 12, respectively). In some embodiments, additional (i.e., new) clusters (groups or subgroups) determined to be required and/or appropriate based on the newly received results that caused the display of search results to be updated automatically may be presented (not shown in FIG. 4).

Updated search results are displayed in a main area of the window. In the example shown, new results 408 and 420 have been inserted into the search results display. In some embodiments, there may be some search results from the original display of results that do not appear on the updated search results window (e.g., previously displayed search result F, G, H, and I of FIG. 3 are not displayed), for example to make room for more relevant results the receipt and/or processing of which caused the display to be updated. In some embodiments, the order of the displayed search results is updated, e.g., if subsequently received results are determined to be more relevant than at least some previously displayed results. The updated search results are represented in FIG. 4 by search results A, a, B, C, b, c, d, D, and E. In this example results a (408) and b-d (420) have been integrated in their rank order within the combine set of results (original plus subsequently received/processed). The updated ranking summary is displayed in a top area of the window. The updated ranking summary (410-414) includes for each respective star ranking an updated total number of search results. In some embodiments, a no star ranking and updated no star associated search results are displayed (not shown in FIG. 4). In various embodiments, one or more of the following are shown in the updated search results display window (not shown in FIG. 4): an updated total number of search results, an updated total number of search results shown on the current window page, an updated total number of window page results, or any other appropriate statistics or totals relevant to the updated search results.

Control buttons 416 and 418 are displayed in a top area of the window. Pause button 416 operates similar to pause button 316 of FIG. 3. Stop button 418 operates similar to stop button 318 of FIG. 3. In some embodiments, if "pause" button 416 is pressed, the button reads "play". Clicking on play later, will update the screen to the latest status of the search. While pause stops the update of the screen, the search is still progressing in the background—some sources are returning additional results. When the search is over, the pause button is no longer visible.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of presenting search results, comprising:
   receiving a first set of results from a first source for a search query;
   displaying in a window at least a portion of the first set of results in an order determined at least in part by a first corresponding attribute of each respective result;
   receiving a second set of results from a second source for the search query, wherein the second set of results may be ordered at least in part by a second corresponding attribute, and wherein the first corresponding attribute is different from the second corresponding attribute;
   normalizing the second corresponding attribute of each respective result in the second set of results to the first corresponding attribute of each respective result in the first set of results, in part to integrate the second set of results with the first set of results;
   combining the first set of results and the normalized second set of results;
   ordering the combined set of results at least based in part on the first corresponding attribute of each respective result in the combined set of results;
   determining a portion of the ordered combined set of results that fits in the window; and
   providing dynamically an automatically updated display in the window that includes the portion of the ordered combined set of results that fits.

2. A method as in claim 1, wherein the first corresponding attribute comprises one or more of the following: a degree of relevance of the respective search result to the search; a date of the search result; a score associated with the search result; and the source of the search result.

3. A method as in claim 2, wherein the degree of relevance is calculated using one of the following: HITS algorithm, PageRank, or TrustRank.

4. A method as in claim 2, wherein the degree of relevance is based at least in part on one or more of the following: a file element, a title word, a keyword, a text topic area, a related term use, metadata, a citation, a reference link, document organization, document hierarchy, a heading, the age of file, the size of file, the type of file, grammar use, spelling accuracy, stop word frequency, reading level, or duplicate content.

5. A method as in claim 1, wherein the first source comprises one or more of the following: a first processing batch, a first internal repository, and a first external repository.

6. A method as in claim 1, wherein the second source comprises one or more of the following: a second processing batch, a second internal repository, and a second external repository.

7. A method as in claim 1, wherein the updated display includes one or more of the following: an updated number of results associated with a cluster, an updated number of results associated with a star ranking, an updated total number of results, an updated total number of window pages of results, or an updated number of results for the displayed window page.

8. A method as in claim 1, wherein the updated display includes an updated set of search results.

9. A method as in claim 8, wherein the updated display includes inserted search results.

10. A method as in claim 8, wherein providing the updated display includes not displaying one or more previously displayed search results.

11. A method as in claim 8, wherein providing the updated display includes displaying the updated results in an updated order.

12. A method as in claim 1, wherein the automatic updating of the display is paused by a user indication.

13. A method as in claim 1, wherein the automatic updating of the display and the search are stopped by a user indication.

14. The method of claim 1 further comprising separating the first set of results into one or more clusters wherein each cluster comprises a subset of the first set of results that are determined to be similar for a particular aspect; and displaying an indication of each of the one or more clusters.

15. The method of claim 14 wherein the particular aspect includes one of the following: subject, file type, time period, keyword, source, company or organization.

16. The method of claim 14 further comprising:
integrating the second set of results into the one or more clusters wherein each cluster comprises a subset of a combined set including the first set of results and second set or results that are determined to be similar for a particular aspect;
and displaying an updated indication of each of the one or more clusters.

17. The method of claim 16, wherein providing dynamically includes automatically updating without requiring any refresh from a user.

18. The method of claim 17, wherein providing dynamically includes providing continuously an automatically updated display.

19. The method of claim 16, wherein the first set of results includes metadata for each respective result that enables treating the search results as typed information for content management system integration.

20. The method of claim 1 wherein the first set of results includes an associated information for each respective search result.

21. The method of claim 20 wherein the associated information includes metadata that enables treating the search results as typed information.

22. The method of claim 1, wherein providing dynamically an automatically updated display includes providing continuously an automatically updated display.

23. A computer program product for presenting search results, the computer program product being stored in a non-transitory computer readable storage medium and comprising computer instructions for:
receiving a first set of results from a first source for a search query;
displaying in a window at least a portion of the first set of results in an order determined at least in part by a first corresponding attribute of each respective result;
receiving a second set of results from a second source for the search query, wherein the second set of results may be ordered at least in part by a second corresponding attribute, and wherein the first corresponding attribute is different from the second corresponding attribute;
normalizing the second corresponding attribute of each respective result in the second set of results to the first corresponding attribute of each respective result in the first set of results, in part to integrate the second set of results with the first set of results;
combining the first set of results and the normalized second set of results;
ordering the combined set of results at least based in part on the first corresponding attribute of each respective result in the combined set of results;
determining a portion of the ordered combined set of results that fits in the window; and
providing continuously an automatically updated display in the window that includes the portion of the ordered combined set of results that fits.

24. The computer program product of claim 23, wherein the first corresponding attribute comprises one or more of the following: a degree of relevance of the respective search result to the search; a date of the search result; a score associated with the search result; and the source of the search result.

25. The computer program product of claim 23, wherein the automatic updating is paused by a user indication.

26. The computer program product of claim 23, further comprising computer instructions for separating the first set of results into one or more clusters wherein each cluster comprises a subset of the first set of results that are determined to be similar for a particular aspect; and displaying an indication of each of the one or more clusters.

27. A system for presenting search results, comprising:
a processor; and
a memory coupled with the processor, wherein the memory is configured to provide the processor with instructions which when executed cause the processor to:
receive a first set of results from a first source for a search query;
display in a window at least a portion of the first set of results in an order determined at least in part by a corresponding attribute of each respective result;
receive a second set of results from a second source for the search query, wherein the second set of results may be ordered at least in part by a second corresponding attribute, and wherein the first corresponding attribute is different from the second corresponding attribute;
normalize the second corresponding attribute of each respective result in the second set of results to the first corresponding attribute of each respective result in the first set of results, in part to integrate the second set of results with the first set of results;
combine the first set of results and the normalized second set of results;
order the combined set of results at least based in part on the first corresponding attribute of each respective result in the combined set of results;
determine a portion of the ordered combined set of results that fits in the window; and
provide continuously an automatically updated display in the window that includes the portion of the ordered combined set of results that fits.

\* \* \* \* \*